US011783829B2

(12) United States Patent
Mane et al.

(10) Patent No.: US 11,783,829 B2
(45) Date of Patent: Oct. 10, 2023

(54) DETECTING AND ASSIGNING ACTION ITEMS TO CONVERSATION PARTICIPANTS IN REAL-TIME AND DETECTING COMPLETION THEREOF

(71) Applicant: Outreach Corporation, Seattle, WA (US)

(72) Inventors: Rohit Ganpat Mane, Seattle, WA (US); Abhishek Abhishek, Sammmish, WA (US); Krishnamohan Reddy Nareddy, Bellevue, WA (US); Rajiv Garg, Seattle, WA (US)

(73) Assignee: Outreach Corporation, Seattle, WA (US)

( * ) Notice: Subject to any disclaimer, the term of this patent is extended or adjusted under 35 U.S.C. 154(b) by 180 days.

(21) Appl. No.: 17/244,804

(22) Filed: Apr. 29, 2021

(65) Prior Publication Data
US 2021/0343282 A1 Nov. 4, 2021

Related U.S. Application Data

(60) Provisional application No. 63/018,898, filed on May 1, 2020.

(51) Int. Cl.
*G10L 15/22* (2006.01)
*G10L 15/06* (2013.01)
*G10L 25/51* (2013.01)

(52) U.S. Cl.
CPC ............ *G10L 15/22* (2013.01); *G10L 15/063* (2013.01); *G10L 25/51* (2013.01)

(58) Field of Classification Search
CPC ......... G10L 15/00; G10L 15/02; G10L 15/06; G10L 15/063; G10L 15/065; G10L 15/07;
(Continued)

(56) References Cited

U.S. PATENT DOCUMENTS 6,324,513 B1 * 11/2001 Nagai .................... G10L 15/22
704/E15.04
10,374,816 B1 8/2019 Leblang et al.
(Continued)

OTHER PUBLICATIONS

Github, "MITIE: MIT Information Extraction," Feb. 10, 2019, seven pages, [Online] [Retrieved on May 25, 2021] Retrieved from the Internet: <URL: https://github.com/mit-nlp/MITIE/>.
(Continued)

*Primary Examiner* — Qi Han
(74) *Attorney, Agent, or Firm* — Fenwick & West LLP (57) ABSTRACT

Described herein is a system for automatically detecting and assigning action items in a real-time conversation and determining whether such action items have been completed. The system detects, during a meeting, a plurality of action items and an utterance that corresponds to a completed action item. Responsive to detecting the utterance, the system generates a similarity score with respect to a first action item of the plurality of action items. The system compares the similarity score to a first threshold. Responsive to determining that the similarity score does not exceed the first threshold, the system generates a second similarity score with respect to a second action item of the plurality of action items. The system compares the second similarity score to a second threshold, which exceeds the first threshold. Responsive to determining that the second similarity score exceeds the second threshold, the system marks the second action item as completed.

20 Claims, 9 Drawing Sheets

(58) Field of Classification Search
CPC ..... G10L 15/08; G10L 15/10; G10L 15/1822;
G10L 15/183; G10L 15/19; G10L 15/193;
G10L 15/22; G10L 15/26; G10L 15/28;
G10L 2015/0631–0638; G10L 2015/085;
G10L 2015/221–228
USPC .............. 704/239, 231, 235, 236, 238, 240,
704/243–245, 251, 255, 257
See application file for complete search history.

(56) References Cited

U.S. PATENT DOCUMENTS

| | | |
|---|---|---|
| 10,791,217 B1 | 9/2020 | Bussey |
| 11,017,767 B2* | 5/2021 | Schulz .................... G10L 13/08 |
| 2017/0092264 A1 | 3/2017 | Hakkani-Tur et al. |
| 2017/0171693 A1 | 6/2017 | Zhang et al. |
| 2019/0189117 A1 | 6/2019 | Kumar |
| 2019/0273767 A1 | 9/2019 | Nelson et al. |
| 2021/0067626 A1 | 3/2021 | Bussey |
| 2021/0097502 A1* | 4/2021 | Hilleli ...................... G06N 3/08 |

OTHER PUBLICATIONS

PCT International Search Report and Written Opinion, PCT Application No. PCT/US21/29987, dated Aug. 3, 2021, 17 pages.

* cited by examiner

DETECTING AND ASSIGNING ACTION ITEMS TO CONVERSATION PARTICIPANTS IN REAL-TIME AND DETECTING COMPLETION THEREOF

CROSS REFERENCE TO RELATED APPLICATIONS

This application claims the benefit of U.S. Provisional Application No. 63/018,898, filed May 1, 2020, which is incorporated by reference in its entirety.

TECHNICAL FIELD

This disclosure relates generally to speech recognition and understanding and, more particularly, to detecting the state of action items discussed in real-time conversations or meetings.

BACKGROUND

A good amount of daily work life is spent in meetings and conversations ("meeting" and "conversation" are interchangeably used herein and may refer to any collaboration involving an exchange of words or text between two or more users). Yet there are very few tools available that help track an intent of each portion of a meeting or capture important follow-up tasks (also referred to as action items) from the meetings. Often, a meeting host or participant must manually take notes to capture follow-up tasks resulting from the meeting. During the meeting, this notetaker may be distracted and not write their notes in real-time as their attention wanders. If they compile notes after the meeting to compensate, they may need to rely on their memory to remember all the action items that arose from the meeting. Further, they would need to assign owners to each action item so that the action item is followed up on. However, if the notetaker does not recollect correctly, they may leave action items unassigned, which runs the risk of the action item not being followed up on. Further, current meeting systems are unable to properly detect whether action items have been assigned and completed within a plurality of meetings based on context and time of the meetings.

SUMMARY

The disclosed configurations are for a system, a process, and a program code structured on a non-transitory computer readable storage module that are configured to analyze meetings between participants in a meeting in real-time and determine action items from the meetings. The term "real-time" as used herein may refer to scenarios where activity is performed in substantially real-time—that is, within a threshold period of time of a portion of a conversation, such that it is perceived to be immediate or nearly immediate to a human observer. Each action item may be correlated with a participant in the meeting to identify them as the assignee or owner who is responsible for following up on one or more tasks associated with the action item. Action items may be presented to all eligible participants of the meeting in real-time, and may additionally, or alternatively, be stored for offline review by the participants. Automatically identifying an assignee of the action item also ensures that the action item is not left unassigned and the identified individual could be inquired about the status of the action item either in a follow-up meeting or in an offline conversation.

By way of example, in an embodiment, a system structured with one or more processors is configured to execute a process to capture audio of a conversation and transcribe the conversation using a speech recognition system. The system may be provided with metadata from the conversation including the identity of an active speaker. As an example, to derive the identity, a meeting provider (e.g., ZOOM or WEBEX) includes clients that capture audio and video and stream them to the provider's service. The clients detect when there is audio and inform the service in real-time. Thus, the meeting provider receives such signals from the clients in the meeting and may choose to forward that signal as metadata to the system via its application programming interface (API). The system receives, through the API, audio, video, and any other metadata the meeting provider chooses to provide.

When available, the system uses this metadata to associate an utterance with a speaker. The system may analyze the utterance to derive action items and use the metadata and the content of the utterance to determine an assignee for the action item and an intended beneficiary of that action. For example, if speaker A says "I will send you an email" in a meeting, and the only other participant is speaker B, the system can infer that A is the owner of the action item and B is the beneficiary of that action item.

The system may output the action items to participants of the conversation as the system detects the action items or may maintain a record of the action items for review by the participants at a later time. Further, the system may detect, based on utterances, whether one or more tracked action items have been completed. For example, if speaker A says "I sent you the email," the system may mark the action item of "sending an email to speaker B" as complete. The system may continue to monitor a list of action items that are brought up in conversations and mark action items that have been done as complete.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

This description relates to exemplary embodiments for implementing a conversation system that provides insights of various kinds (such as detecting action items) to conversation participants in real-time.

Figure 1:
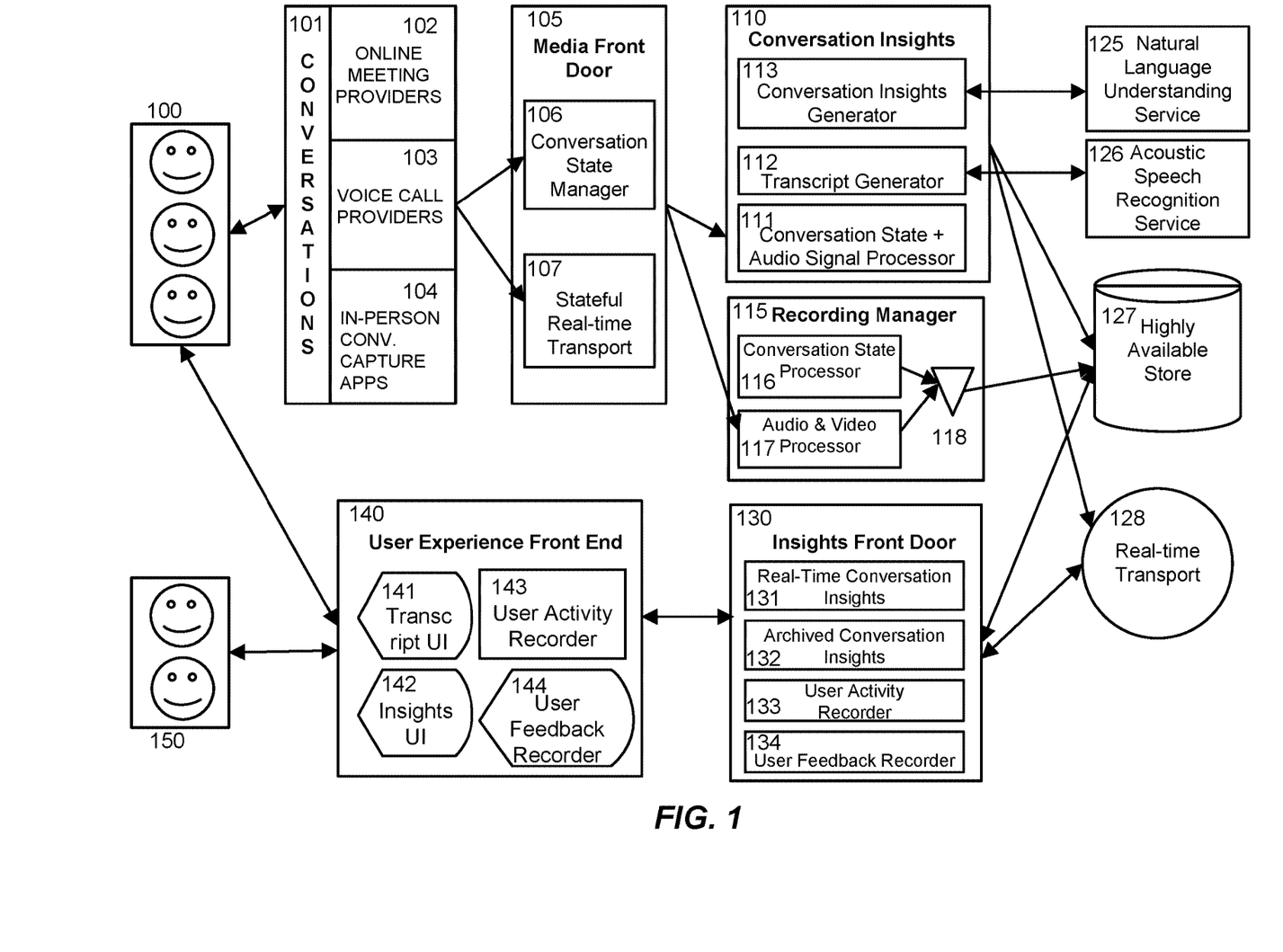
FIG. 1 shows an exemplary embodiment of a complete end to end system.

FIG. 1 shows an exemplary embodiment of a complete end to end system (henceforth referred to as the "system") for tracking action items in conversations. In particular, 100 represents participants in a live conversation involving a voice exchange between the participants (e.g., two or more people). Examples of a live conversation are online (e.g., video or audio) meetings, phone calls, and in-person meetings. 101 represents various providers and platforms such as online meeting providers (102), voice call or other audio providers (103), and applications that capture content of in-person meetings (104) or act as a conduit for transmitting the content to a centralized repository for storage and/or analysis.

Audio, video, and other media signals captured by 102-104 are transmitted to a media front door (105), which processes and distributes the media signals to various service components for further processing. A conversation state manager (106) tracks the state of a conversation and its participants. Conversation state includes, but is not limited to, information such as list of current participants and who is speaking at a current moment. This conversation state is used to generate insights in real-time. The insights may include new actions items, corresponding beneficiaries and owners, and completed action items. A stateful real-time transport (107) mechanism maintains a persistent connection to various downstream services and transmits media and the conversation state for real-time processing.

110 represents conversation insights, where the incoming streams of media and conversation state are processed to provide a range of actionable insights in real-time. The actionable insights may include new action items or reoccurring action items. The conversation state and media are processed by 111, which represents the conversations state and audio signal processor. 111 sends, from the media, audio signals to an acoustic speech recognition service (126) and receives real-time transcript of the conversation. The transcript generator (112) uses the conversation state and a transcript of the conversation to generate a transcript of the conversation. This transcript is processed by the conversation insights generator (113), which uses a natural language understanding (NLU) service (125) to generate a variety of actionable insights in real-time.

The NLU service (125) is used in a generic sense herein to refer to any system that processes natural language text and performs one or more specific tasks. Examples of such tasks are, but not limited to, a) intent classification, where a fragment of text is examined to infer whether it conveys one or more predetermined intents, b) named entity recognition (NER), where entities such as names of people and places, date and time, currencies, etc. are extracted and normalized, and c) dialog generation, where the task involves generating new text or actions to drive a conversation (dialog). Tasks performed by the NLU service (125) may share some common characteristics.

Each task performed by the NLU service (125) is well defined. For example, the task of intent classification involves identifying the range of intents that may be recognized by the NLU service (125). An "intent", as used herein, may include an expression of an intention in speech (which the NLU service (125) converts to text using a speech recognition service (126)). A general conversation between multiple people may include greetings ("Good Morning, Chris"), action items ("I'll email the updated doc to you by tomorrow"), etc. Intents may be predefined in the NLU service (125). In a conversation between a potential buyer and a salesperson, the NLU service (125) may define intents such as "Information Needed" ("what options are available on the 2020 TESLA Model 3?"), "Objection" ("Hmm, that's more than I can afford"), etc. The range of intents may be predefined and specific to an application, which may be supported by a model (e.g., a supervised model that uses examples to represent each of the intents) to automatically determine intents in real-time. Thus, when the potential buyer asks "what options are available on the 2020 TESLA Model 3?", the NLU service (125) can recognize this as a question and analyze the sentence to extract "2020 TESLA Model 3" and "options" and automatically send information to the seller in real-time so the seller can answer the buyer's question quickly. With this intent recognition, the NLU service (125) is able to provide that information in real-time, avoiding a need for a participant to have to answer from memory, look information up, or send an offline response.

In one or more example embodiments, one or more machine learning (ML) models may be trained and tuned to perform the task. Training such models may involve capturing and processing training data. The quality of the inference drawn by the NLU system (125) is strongly influenced by the training phase, and the utility of the inference is strongly influenced by the task definition and how the utility is used downstream.

An acoustic speech recognition (ASR) system (126) processes an acoustic signal (e.g., speech from the media) and generates a textual representation of that speech. Generally speaking, the ASR system (126) performs at least two distinct tasks. The ASR system (126) may interpret an audio signal to extract building blocks (phonemes, words etc.) of an utterance. This task is aided by an acoustic model (AM). While a typical ASR service provides a default acoustic model to represent a range of acoustic environments, some ASR services provide users the ability to customize the model to suit their specific needs. For example, an acoustic model would be tuned differently for conversations on a factory floor versus conversations in a shopping mall. The acoustic model used by the ASR service (126) may be trained on media of conversations in a specific location (e.g., factory floor or mall) labeled with action items mentioned in the conversations. The acoustic model may, in some embodiments, be a neural network, regression model, decision tree, or the like.

The ASR system (126) may also be programmed to generate a composition of an utterance (words, phrases, sentences etc.). This task is aided by a language model (LM). The ASR service (126) may provide a default LM to represent a range of human conversations, in some embodiments, and in other embodiments, the ASR service (126) provides users the ability to customize the LM. For example, a conversation between an enterprise salesperson and a customer would have different language characteristics (vocabulary, abbreviations, context etc.) than a conversation between an airline pilot and an air traffic controller. As with any AI system, the quality of the inference (speech) by the ASR system (126) may be influenced by the quality of the LM used for the inference.

The system is designed for real-time use (users represented by 100) as well as offline use by users (150) who peruse a pre-recorded conversation. The recording manager (115) receives the same data and signals as the real-time conversation insights system (110) and processes the data/signals and stores it for later use. A conversation state processor (116) handles changes to a conversation state such as list of participants, current active speaker(s), and current action items, completed action items, and other metadata.

The audio and video media processor (117) processes and encodes the media (e.g. audio/video signals). Processing involves encoding and compressing the media for efficient storage and truthful reproduction at later renderings. The conversation state and corresponding media are combined (118) for recording in such a way as to recover the relevant context and content to enable playback of an archived conversation. For example, responsive to determining that an offline user (150) wishes to playback audio/video corresponding to an utterance, the system may locate the time of that utterance, seek to the point of the utterance in the recorded conversation, and render the media from that point for the offline user (150) to view/listen to. As described below in relation to the user experience front end (140), In an embodiment, the transcript user interface (UI) (141) may render/display the transcript as a series of utterances (speaker/text) to find the utterance. The user activity recorder (143) may detect a user selection of a UI element associated with an utterance (e.g. "Play" icon). The transcript UI (141) has enough identifying information for that utterance (which meeting it belongs to, where did the audio corresponding to that utterance begin, how long is the audio corresponding to that utterance) and works with the insights front door (130) to retrieve that chunk of audio/video and render it.

Various parts of the end to end system are producing and consuming various pieces of information in real-time as well as storing them for offline use. Two types of services are employed to facilitate the real-time flow and persistent storage of all the intermediate and final fragments of data produced by the system. A real-time transport (128) service is responsible for efficiently encoding, transmitting, and decoding various signals in a secure manner between various components. Where appropriate, the real-time transport service (128) also handles authentication to prevent unauthorized access to the real-time transport service (128). For example, when the transcript generator (112) generates an utterance, the system transfers information about the utterance to the user experience front end (140, described below) in real-time so that the utterance and/or the insight can be rendered to the conversation participants (100).

A highly available store (127) is used to store and retrieve data. 127 may be a database where data may be indexed as needed for efficient retrieval. The highly available store (127) also handles authentication to protect against unauthorized use and enforces data retention policies.

The transcript and insights provided by the system are delivered to the user experience front end (140) to be rendered to users (online—100 and offline—150). The insights front door (130) sits between the system back end (105-128) and the user experience front end (140), which may operate from the public internet. The insights front door (130) isolates the user experience front end (140) from the back end (105-128) to protect the back end from unauthorized access by external users or systems. Once a connection is established with a client device (e.g., for the a user of 100 and 150), various components of the insights front door (130) are used to send and receive data to and from the user experience front end (140). Real-time conversation insights (131) determines what client devices (e.g., computing devices such as computers, phones, and the like) should receive the real-time transcript and insights for a specific conversation and forwards the transcript and insights to those specific connected client devices. As mentioned earlier, the system supports offline users (150), who can review previously archived conversations. Archived conversation insights (132) receives requests for access to a specific archived conversation and works with the back end to retrieve and return transcripts and insights for that conversation.

The user experience front end (140) is a client that interacts with users who are either participating in a real-time conversation or viewing an archived conversation. The transcript UI (141) and the insights UI (142) display transcripts and insights (e.g., generated using conversation insights module 110 in the back end of the system) to the user at the user's client device. The transcripts and insights generated by the system are products of one or more machine learning models, as described previously. A human user may find them less than ideal for their use and may choose to edit them to a) provide feedback to the system and b) to have a more accurate record of the conversation. For example, the ASR service (126) may have transcribed a word incorrectly (e.g., "what about that tax?" instead of "what about that task?"), prompting editing from a conversation participant. 141 and 142 accept such feedback from users and may send the feedback to the NLU service (125) or ASR service (126) for future training of the models. Feedback is captured by the user feedback recorder (144) and forwarded to the NLU service (125) or ASR service (126) through the user feedback recorder (134) in insights front door (130). Some types of feedback result in other updates. For example, when a user edits an utterance (e.g. "tax" to "task" above), the edited utterance may trigger a new insight (e.g., generated by conversation insights module 110). Alternatively, the edit may nullify a previously generated insight that is no longer relevant, considering the feedback provided by the user.

The system is designed to provide personalized, relevant insights to its users. The system uses metadata and a prior knowledge about users to generate such personalized insights. The system is designed to benefit from awareness of user's activity and preferences as expressed by their interaction with the system. The user activity recorder (143) records such activity, with user's implicit or explicit permission, and forwards it to the back end through the user activity recorder (133).

Description of Assigning Action Items

As a conversation gets underway, the system detects the various speakers participating in the conversation and captures their utterances. The utterances are then analyzed to detect intents for actionable items (the terms actionable items, actionable insights, and action items are used interchangeably in this document). As different speakers in the conversation are detected for each utterance, the action items are then assessed to associate them with responsible owners, who are meant to ensure the completion of the action items.

The owner or assignee of an action item is derived by 2 algorithmic approaches. In the first approach, when an intent is uttered in reference to an individual participating in the conversation by name, the system may be able to associate the named individual as the assignee of the action item. The system attempts to collocate a named entity in relation to the action verb to determine whether the entity should be the owner of the action item. For example, in the utterance "Can John Smith share the document with Mike Hunt?", the system may detect one action verb ("share") and two named entities ("John Smith" and "Mike Hunt"). But the correct assignee of the action item "share the document" should be John Smith and not Mike Hunt.

The detection of named entities may be performed using a Named Entity Recognition (NER) system, which may be part of the NLU system (125). A NER system can extract the two names "John Smith" and "Mike Hunt". The identification and extraction may be performed using a machine learning model trained on the tasks of NER. Pronouns, time (tomorrow, for e.g.), and verbs (actions) may similarly be extracted, and the system may infer who the action should be assigned to using template matching (e.g., identifying a match to predefined patterns and selecting a template that applies to this utterance and its components).

In the second approach, responsive to determining that an intent is uttered in reference to the context of the conversation or by co-referencing a previously named entity, the system will use contextual references to derive the assignee of the action item. For example, if these sentences were uttered in the conversation "John is working on creating the document" and "Can he send it to me when it is done?", "he" in this case is referring to "John". The system may derive this understanding using coreference analysis to infer that "he" refers to "John" based on John being the subject of the previous utterance. The system will apply coreference resolution to derive the named entity from the two utterances. In another example of a conversation between two individuals, if John says "I'm working on creating the document" and immediately Mike says "Can you send it to me after it is done?", "you" in this case is referring to John, who spoke prior. The system will apply contextual correlation to determine the speaker who is being referred to by the pronoun "you".

In both approaches, it is important that the system identify the speakers in the conversation to accurately determine the owner or assignee of the action item. The named entity detected will be compared against the list of speakers or participants in the conversation to assign the action item appropriately.

Example Processing

The method to assigning owners to action items detected during a conversation can be separated into two distinct stages: (1) identifying the speaker of an utterance in a conversation and (2) detecting an action item from the utterance and assigning it to the responsible owner.

The system uses a combination of different techniques to identify a speaker of an utterance. Namely, matching active speaker information received from the conversation provider (102-104) against a timestamped utterance, using speech signature matching techniques to match an utterance against a speaker signature, and inferring the speaker by virtue of elimination amongst identified speakers.

Figure 2:
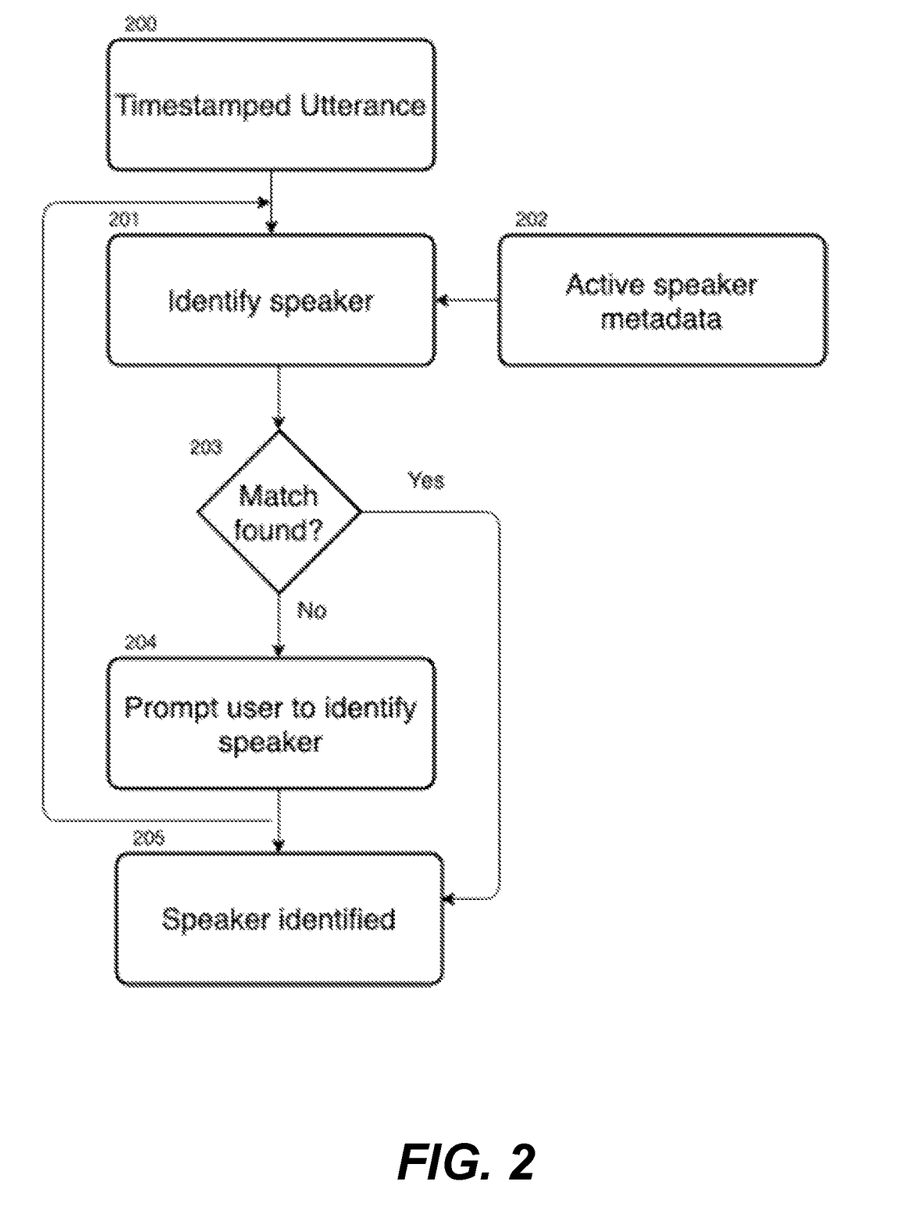
FIG. 2 describes an exemplary data flow for identifying a speaker of an utterance, according to one embodiment.

FIG. 2 describes an embodiment of an exemplary data flow for identifying (205) a speaker of an utterance. The method, performed by the system, starts with a timestamped utterance (200) in a conversation and ends with the identity of the speaker (205). The timestamped utterances received (e.g., by the conversation insights generator (113) from the ASR service (126) and/or NLU service (125)) are analyzed to identify the speaker (201) of the utterance in real-time. Typically, timestamped active speaker metadata (202) is provided by the provider (102-104) during the conversation. The metadata can include unique identifying information of the speaker such as name, identifier (e.g., username), email identifier, or phone number and timestamps of when they were speaking during the conversation. The system ensures that the timestamps of the utterances and the timestamps received from the provider (102-104) are related to each other. This allows the system to precisely correlate the timestamps in these two otherwise unrelated entities. The timestamped utterance is matched against the timestamped active speaker metadata to determine the speaker of that utterance.

Responsive to sufficient metadata not being available from the provider (102-104) to enable speaker identification, the system employs prerecorded audio-based speaker recognition techniques to detect the speaker by comparing utterance's audio signal with speech signatures of previously identified speakers. Prerecorded speech signatures are usually obtained when customers are onboarded to the provider (102-104). Responsive to a new speaker being reliably identified during a conversation, say with input from a meeting host, audio samples for the newly identified speaker from that conversation could be captured to increase the system's inventory of known speakers and their audio samples.

Responsive to the utterance speaker being still unidentified, the system attempts to infer the speaker by virtue of elimination against identified speakers from the meeting invite. For example, if the meeting invite for a meeting has N participants and N−1 speakers have been identified during the conversation, the unknown speaker is identified as the Nth participant in the invite. This may be in a 1:1 conversation, such as a phone call, between participants A and B where A has already been identified and the system can infer that the unknown speaker is B. Responsive to none of the above techniques being successful in identifying the speaker of the utterance (203), the system prompts the host of the meeting to identify the unknown speaker in real-time (204). The host, and/or one or more other participants, could be presented with an option to select from a list of unmatched participants from the meeting or presented with an input form to enter the identity of the speaker.

Once the host or another participant identifies the speaker, the system is provided with a feedback mechanism so that the system can identify previous or future utterances of the speaker. The host could also choose to identify the speaker after the meeting is over, provided the host is presented with a transcript of the meeting with unidentified utterances clearly marked by the system. This offline feedback is also captured by the system to learn about the identity of the speaker and correlate other utterances from that speaker.

Figure 3:
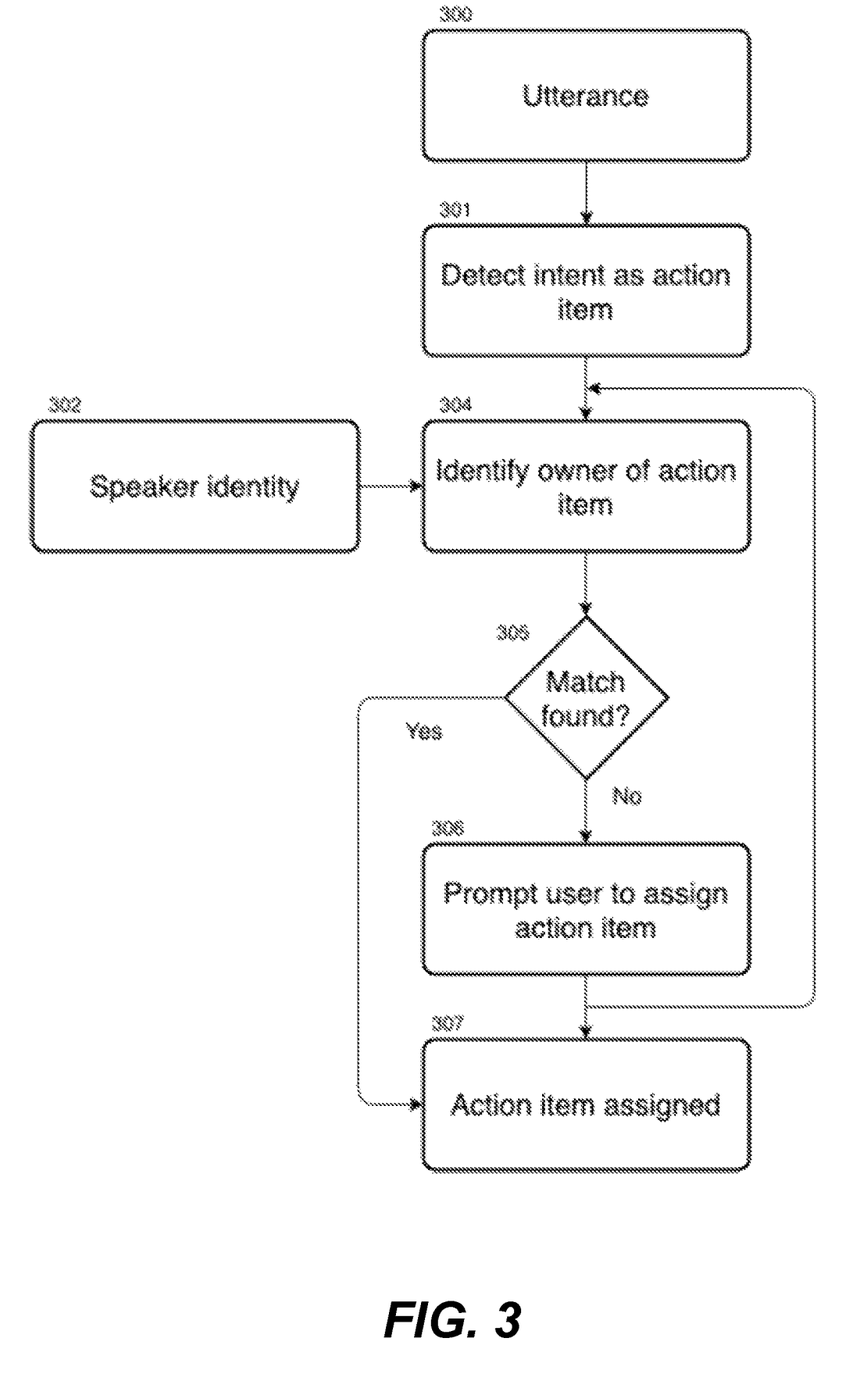
FIG. 3 describes an exemplary data flow for detecting and correlating an actionable intent with a conversation participant, according to one embodiment.

FIG. 3 describes an exemplary data flow of an embodiment for detecting and correlating an actionable intent with a conversation participant. The method, performed by the system, starts with an utterance (300) and ends with an association of the action item detected with the assignee (307). The NLU service (125) processes an utterance to identify intents which are classified as actionable items (301). The system uses the speaker identity (302) associated with the utterance to infer (e.g., by the conversation insights generator (113)) who the resulting action item(s) should be assigned to (e.g., as described above with respect to FIG. 2). The techniques used to identify the assignee of the action item are described further below. Responsive to speaker identity not being detected or the service not being able to deterministically find a match (305), the host of the meeting (or another participant) is prompted to identify the owner of the action item (306). The host (or another participant) could be presented with an option to select from a list of meeting participants from the meeting or presented with an input form to enter the identity of the owner via the transcript UI (141) or insight UI (142). Responsive to determining that the host (or another participant) has identified the owner via the prompt, the system is provided with feedback via the user feedback recorder (144) so that the system can learn and better identify action item owners in the future.

Figure 4:
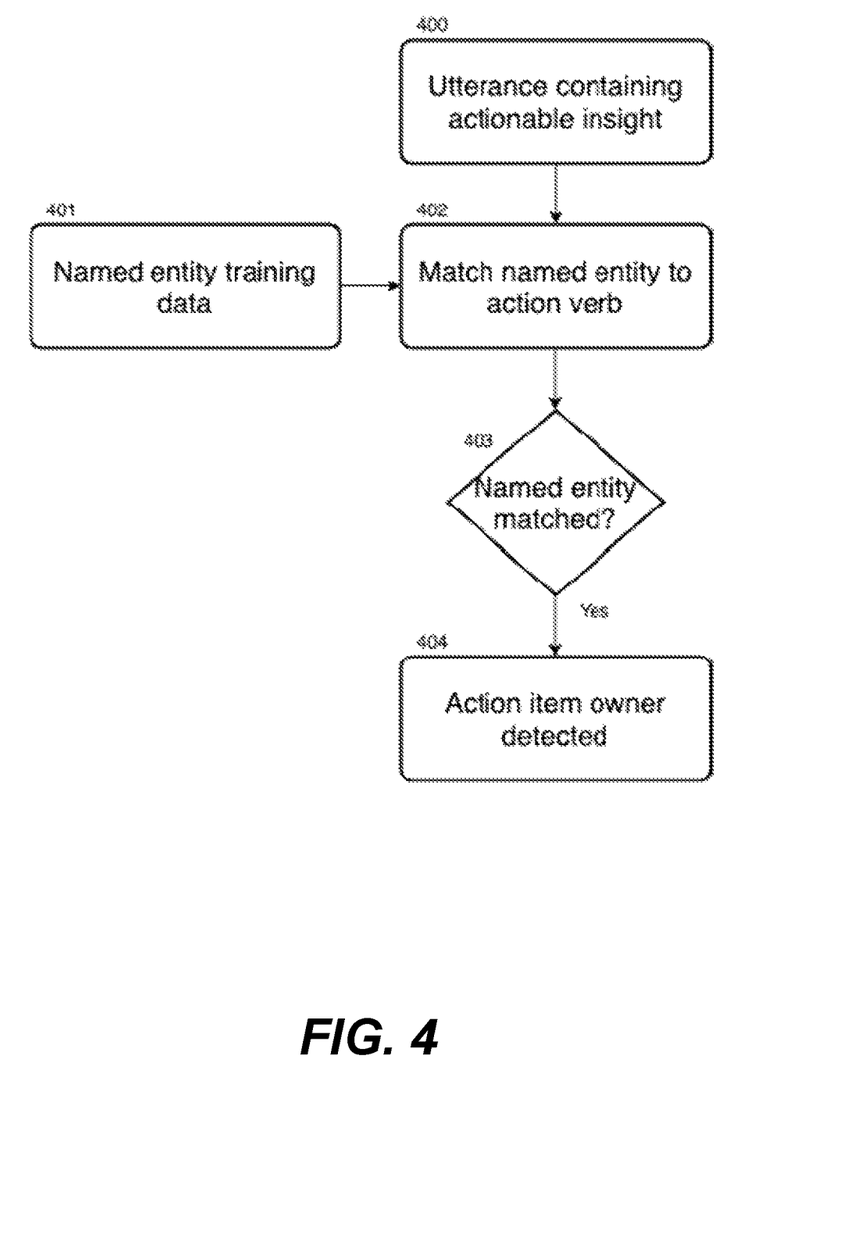
FIG. 4 describes an exemplary data flow for matching an action item to its owner using a named entity detected within the utterance, according to one embodiment.

FIG. 4 describes an embodiment of an exemplary data flow for matching an action item to its owner using a named entity detected within the utterance. The conversation insights generator (113) may perform the process of FIG. 4. The data flow starts with an utterance (400) for which an actionable insight was detected and associating it with a named entity (404) mentioned in the utterance, the association of which may be stored for later retrieval. The NLU service (125) trained and deployed by the system employs a number of named entities such as pronouns, nouns, action verbs, and dates (401). The utterance is decomposed to extract named entities and the action verb associated with the generated actionable item. Collocation techniques are applied (402) to detect whether the action verb is collocated with any of the named entities detected and the ordering relation of the terms are analyzed to determine (403) whether the named entity is the responsible owner of the action item. For example, in the utterance "Can John send us pricing details?", the action verb "send" is collocated right after the named entity "John," so the conversation insights generator (113) may determine that the action item was requested of the named entity. The conversation insights generator (113) may perform the assignment. The action item and assignment may then be forwarded through the insights front door (130) to the user experience front end (140) where the user is presented with the action item and the corresponding owner information (name) via a UI at a client device of the user.

Figure 5:
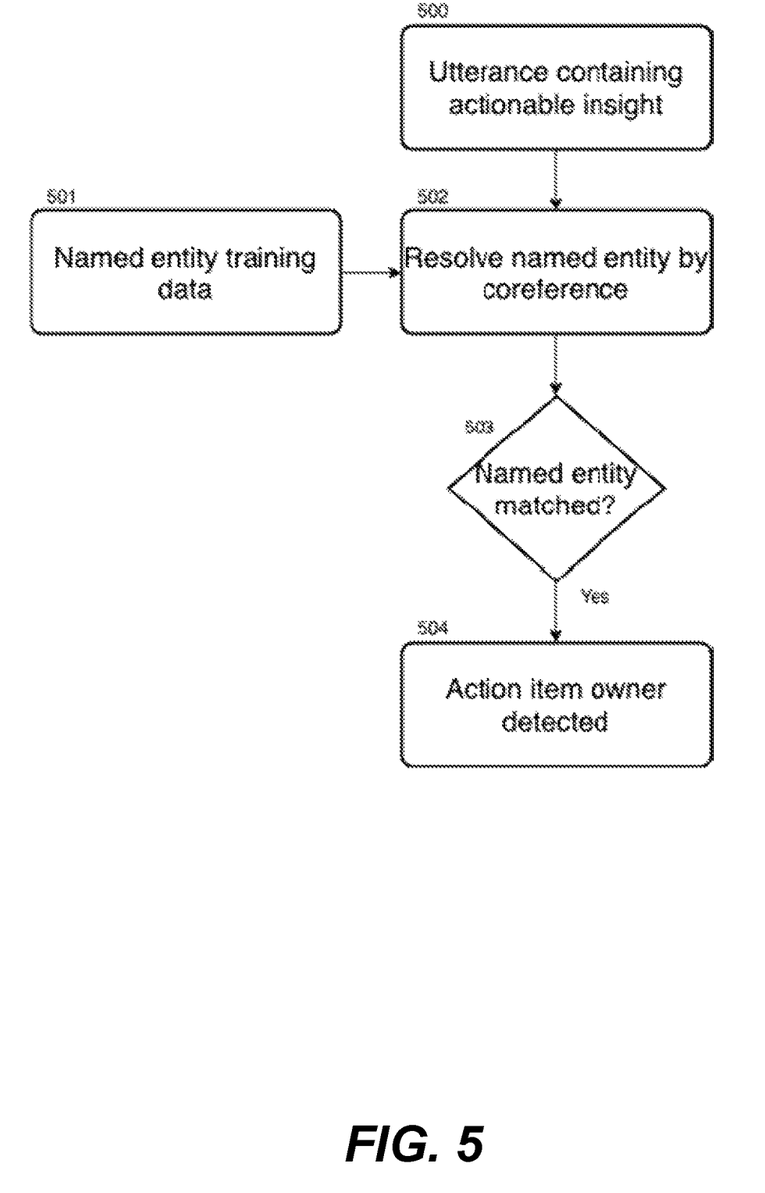
FIG. 5 describes an exemplary data flow for matching an action item to its owner by a co-referenced entity detected within the utterance, according to one embodiment.

FIG. 5 describes an embodiment including an exemplary data flow for matching an action item to its owner by a co-referenced entity detected within an utterance. The data flow may be performed by the system and starts with an utterance (500) for which an actionable insight was detected and associating it with a co-referenced entity (504) mentioned in the utterance. Named entity training data (501) and previous utterances from the conversation are analyzed to determine the named entity referenced in the current utterance (502). The entity could be referenced by mentioning them earlier in the same sentence (for example, "John is a hard worker and he always gives his best"), or in a previous utterance (for example, "John is a kind person. I've always enjoyed his company"). The referenced entity could also be related to a participant in the conversation. For example, in a conversation John could say "I was in the Bahamas last weekend" and Mike could respond with "I hope you had a good time" with reference to "John" when he says "you". Colocation techniques are applied to determine (503) whether the co-referenced entity is the responsible owner of the action item.

Figure 6:
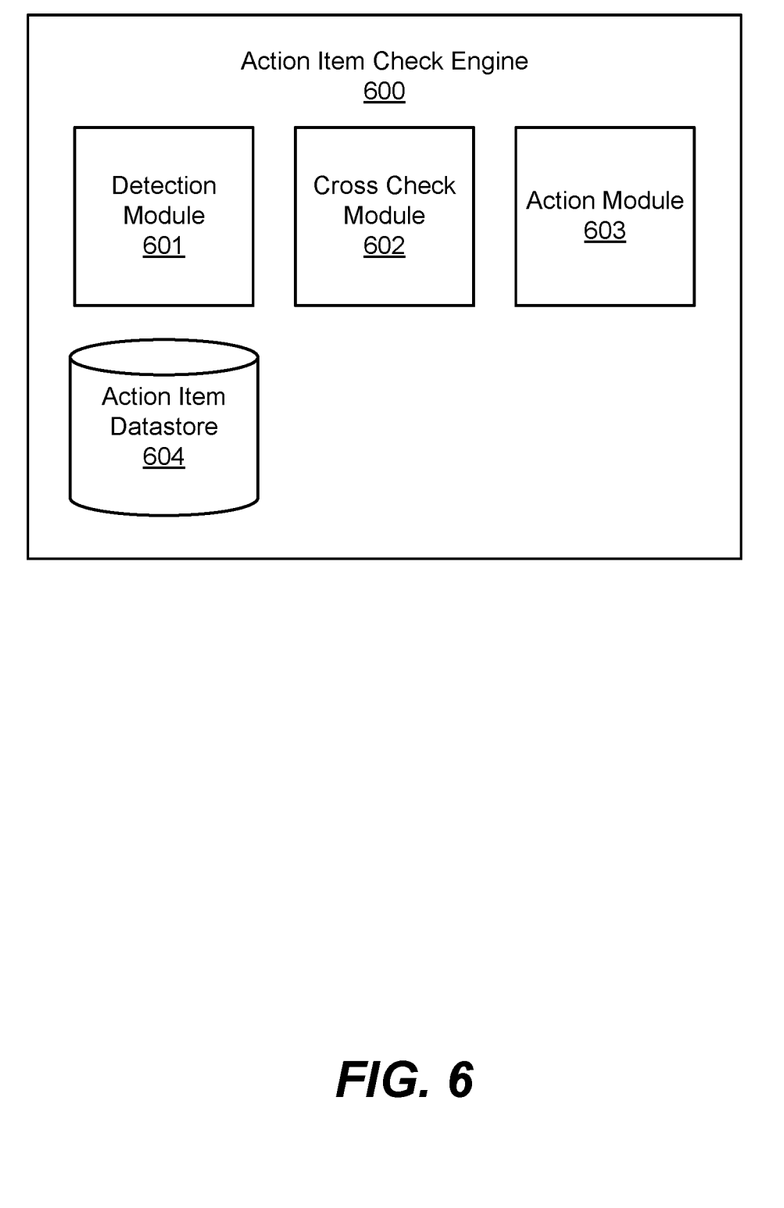
FIG. 6 is a block diagram of an action item check engine 600, according to one embodiment.

FIG. 6 is a block diagram of an action item check engine 600, according to one embodiment. The action check engine 600 may be executed by the end to end system to determine whether action items have been completed based on media from conversations. The action check engine 600 includes a detection module 601, a cross check module 602, an action module 603, and an action item datastore 604. In some embodiments, the action item check engine includes additional or alternative modules or datastores than those depicted in FIG. 6.

The detection module 601 receives media for a conversation from providers (102-104). The detection module 601 may analyze (e.g., using the audio and video media processor (117), NLU service 125, and/or ASR service 126 of the system) the data to process utterances from the data and determine new and completed action items from within the utterances. The detection module 601 may store new action items in the action item datastore 604 along with one or more assignees of the action item and a status of "incomplete". For example, the detection module 601 may determine from the utterance "Can you email Vivian?" in a first conversation between Josh and Winston that Josh should email Vivian. The detection module 601 stores the action item "email Vivian" in the action item datastore 604. When the detection module 601 detects, from an utterance, a completed action item (e.g., "I emailed Vivian"), the detection module 601 sends the completed action item to the cross check module 602.

The cross check module 602 compares completed action items to action items in the action item datastore 604 that have the status of "incomplete" (henceforth referred to as "incomplete action items"). In particular, the cross check module 602 retrieves incomplete action items from the action item datastore 604. In some embodiments, the cross check module 602 receives, from the conversation state manager (106), the participants of the conversation and only retrieves incomplete action items associated with one or more of the participants in the conversation. In other embodiments, the cross check module 602 may receive the identity of the participant who said the utterance indicating the completed action item from the conversation state manager (106) and only retrieve incomplete actions items assigned to that participant. The incomplete action items may be from the current conversation between the participants or may be from previous conversations. In some embodiments, the cross check module 602 may retrieve action items that were detected by the system within a threshold amount of time (e.g., within the last week, month, year, etc.) of the conversation or a specific number of action items. The threshold amount of time and specific number may be specified for the system by an administrator or participant of the current conversation.

For each retrieved incomplete action item, the cross check module 602 generates a similarity score between the incomplete action item and the completed action item. In some embodiments, the similarity score may be a direct comparison between the words of the incomplete action item with the completed action item. For example, "Talk with Marc" and "I talked with Marc" both contain versions of "email" and "Marc," which the cross check module 602 may score higher than "Talk with Marc" and "I talked with Marianne." In another embodiment, the cross check module 602 may create, using word embeddings, a vector in a vector space representing each of the incomplete action item and the completed action item (or the utterances associated with each). The cross check module 602 determines the similarity score using cosine similarity between the two vectors in a vector space. In further embodiments, the cross check module 602 may use fuzzy logic or one or more machine learning models to determine similarity scores. For example, the one or more machine learned models may be trained on a plurality of pairings of action items and utterances, where each pairing is labeled with a similarity score.

In some embodiments, the cross check module ranks the incomplete action items and associated similarity scores. For instance, the cross check module 602 may rank the incomplete action items from highest to lowest similarity score. In another instance, the cross check module 602 may rank the completed actions items from most recently to least recently added to the action item datastore 604. The cross check module 602 may compare the similarity scores to one or more threshold based on the ranking of the associated incomplete action items.

The cross check module 602 compares similarity scores to one or more thresholds to determine whether the completed action item is associated with one of the incomplete action items. In some embodiments, the cross check module 602 compares each similarity score to the same threshold. In other embodiments, the cross check module 602 may compare the similarity scores to a threshold determined for the associated incomplete action item. For instance, the cross check module 602 may use a higher threshold for a similarity score of an incomplete action item that was more recently (e.g., less than a day ago) added to the action item datastore 604 than for an incomplete action item that was added to the action item datastore 604 less recently (e.g., more than a day ago). In another example, the cross check module 602 may determine the threshold for each similarity score based on the context of the associated incomplete action item and the completed action item. The context may include a type of conversation associated with the incomplete action item (e.g., a work meeting, personal discussion, webinar, etc.), which may be stored in the action item datastore 604. For example, when the completed action item is associated with a weekly team conference call, the threshold for an incomplete action item associated with the same weekly conference call may be lower than for an incomplete action item associated with a company caucus meeting. Responsive to determining that a similarity score exceeds the threshold, the cross check module 602 sends an indication to the action module 603 that the incomplete action item associated with the similarity score has been completed.

The action module 603 takes action based on indications received from the cross check module 602. For instance, the action module 603 may mark the status of the incomplete action item from the indication as "complete" in the action item database 604. Doing so may reduce bandwidth and processing for the system. For example, in an embodiment where the action module 603 changes the status of action items that were first detected and completed within the same meeting, the action module 603 may update the status of the action items but not need to send out an alert indicating that the action items were completed to user, reducing bandwidth. The action module 603 may further associate the utterances of the incomplete action item and the completed action item in the action item datastore 604 such that the pairing can be used to train models that detect whether action items have been completed based on utterances. The action module 603 may, additionally or alternatively, notify the assignee of the incomplete action item, a person who requested the incomplete action item, and/or other participants of the conversation where the incomplete action item was detected that the incomplete action item was completed and who completed the previously incomplete action item.

Figure 7:
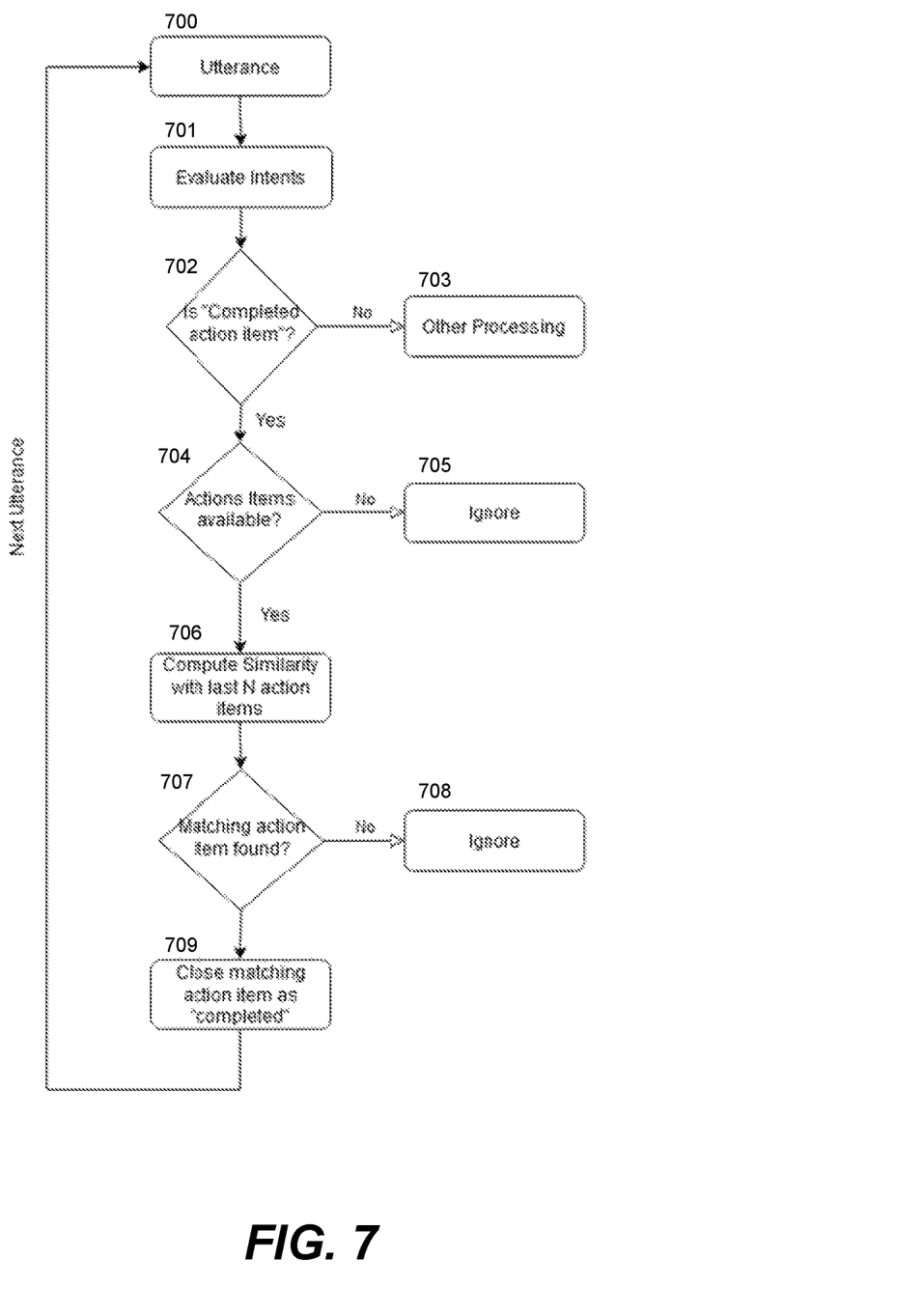
FIG. 7 describes an exemplary data flow for detecting completed action items and closing the corresponding action items, according to one embodiment.

FIG. 7 describes an exemplary data flow for detecting completed action items and closing the corresponding action items as the completion of action items is detected during a meeting. This method extends the existing (301) action item detection method by introducing a new intent: "completed action item". The new intent may be triggered when an utterance indicates that an action has already been taken. For example, the utterance "John will send you the Q2 sales pipeline" is an "action item" and the utterance "I already sent it today in the morning" is a "completed action item". One or more processors of the system may execute any module or computer program product described above to perform the functionality of FIG. 7. The one or more processors may be referred to collectively as a "processor" herein.

The method starts at 700, where the detection module 601 detects an utterance emitted by the NLU service (125), which is evaluated by 701 to detect applicable intents. In 702, the detection module 601 determines whether a "completed action item" is detected. Responsive to not detecting a "completed cation item," the detection module 601 performs other processing at 703, such as checking for new action items, new completed action items, and the like in utterances. Responsive to detecting a "completed action item", the detection module 601 sends the "completed action item" to the cross check module 602 to determine whether the "completed action item" applies to an action item that was detected earlier in the same meeting or in a previous meeting via the cross check module 602. To this end, in 704, the cross check module 602 determines whether there are any open action items for the current meeting or for past meetings including one or more of the same participants. Responsive to determining that there are one or more open action items, the cross check module 602 proceeds to determine whether any of those open action items can be matched with the current "completed action item". To perform this determination, in 706, the cross check module 602 evaluates the last N (e.g., N=2) action items within M minutes (e.g., M=3 minutes) in order to identify an action item to which the completed action refers. The cross check module 602 may evaluate the last N action items within the current meeting or may evaluate the last N actions items associated with one or more participants of the meeting in previous meetings. The choice of N and M scopes the matching to a narrow context. N and M may be defined by an administrator or by host of a meeting, or may be determined automatically (e.g., M may be set to an elapsed time of a meeting so far, to a number of minutes back to when the person who uttered what spawned the "completed action item" determination joined the meeting or first spoke in the meeting, and the like; N may be set to a number of average action items for meetings the person who uttered what spawned the "completed action item" has been in, an average number of actions items within M minutes, and the like). The evaluation may be based on computing similarity between the completed action item and the candidate action items to determine whether they match.

The cross check module 602 may determine whether the completed action item and any candidate action item matches 707 using, for example, a similarity score such as the cosine similarity between two vectors in a vector space, where each utterance is a vector created using word embeddings. Within an embodiment, the cross check module 602 may begin its analysis by first examining a most recent action item. The cross check module 602 may determine 707 that a match exists responsive to the most recent action item's similarity to the completed action item exceeding a threshold similarity score. Responsive to determining that the threshold is not exceeded 708, the cross check module 602 may examine a next most recent action item, and so on, until the cross check module 602 has exhausted each of the candidate action items. In an embodiment, because less recent action items are farther in time and context from the completed action item, the cross check module 602 may apply a higher threshold similarity score. The threshold similarity score may be weighted based on a passage of time between the most recent action item and an action item being currently evaluated by the cross check module 602. For example, in this embodiment, the similarity may be higher for older action items. Responsive to a matching action item being detected, the action module 603 may match the completed action item with that action item in 707 and declare 709 the action item "closed".

Figure 8:
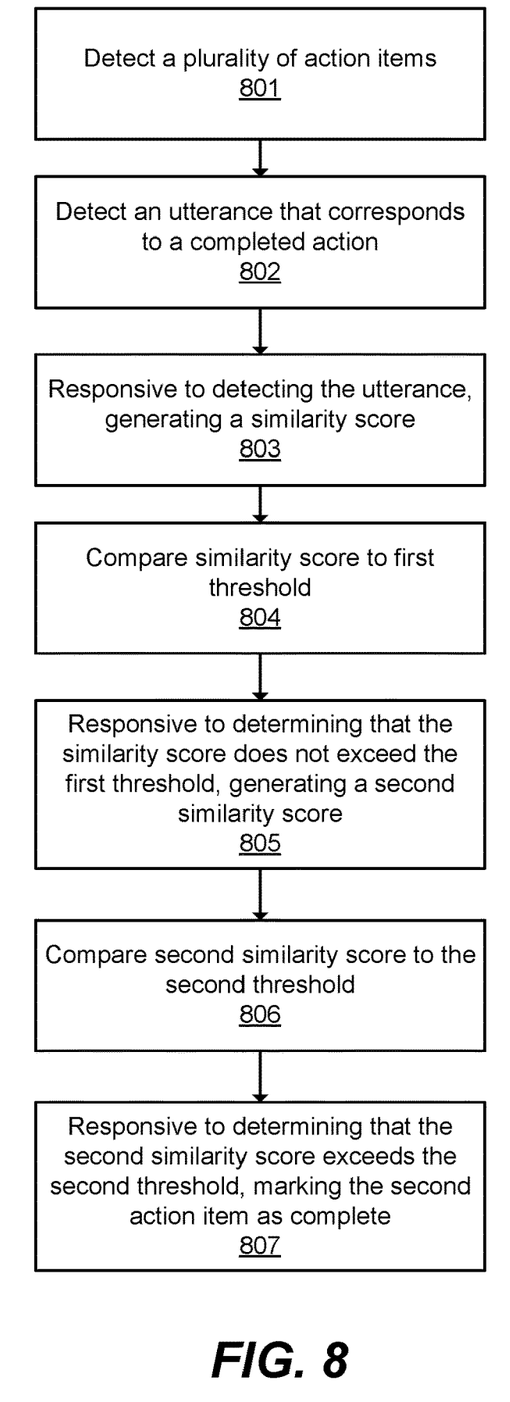
FIG. 8 describes an exemplary data flow for marking an action item as complete, according to one embodiment.

FIG. 8 describes an exemplary data flow for marking an action item as complete, according to one embodiment. In particular, the detection module 601 detects 801, during a meeting, a plurality of action items. The detection module 601 may store the action items in the action item datastore 604 along with actions items detected during other meetings. The detection module 601 detects 802, during the meeting, an utterance that corresponds to a completed action item. Responsive to detecting the utterance, the detection module 601 sends the completed action item to the cross check module 602 and the cross check module 602 generates 803 a similarity score with respect to a first action item of the plurality of action items. The similarity score may be determined based on a cosine similarity, determined based on a machine learning model trained one pairings of action items with completed action items labeled with similarity scores, or determined using fuzzy logic.

The cross check module 602 compares 804 the similarity score to a first threshold. Responsive to determining that the similarity score exceeds the first threshold, the cross check module 602 sends an indication to the action module 603, which marks the action item as complete in the action item datastore 604. Responsive to determining that the similarity score does not exceed the first threshold, the cross check module 602 generates 805 a second similarity score with respect to a second action item of the plurality of action items. The second similarity score exceeds the first threshold, which may be due to the second action item having been detected further in time from a current time than the first action item. The cross check module 602 compares 806 the second similarity score to a second threshold. Responsive to determining that the second similarity score exceeds the second threshold, the cross check module 602 sends an indication to the action module 603, which marks 807 the second action item as completed in the action item datastore 604. Alternatively, the action module 603 may notify one or more participants or an assignee that the action item was completed.

Figure 9:
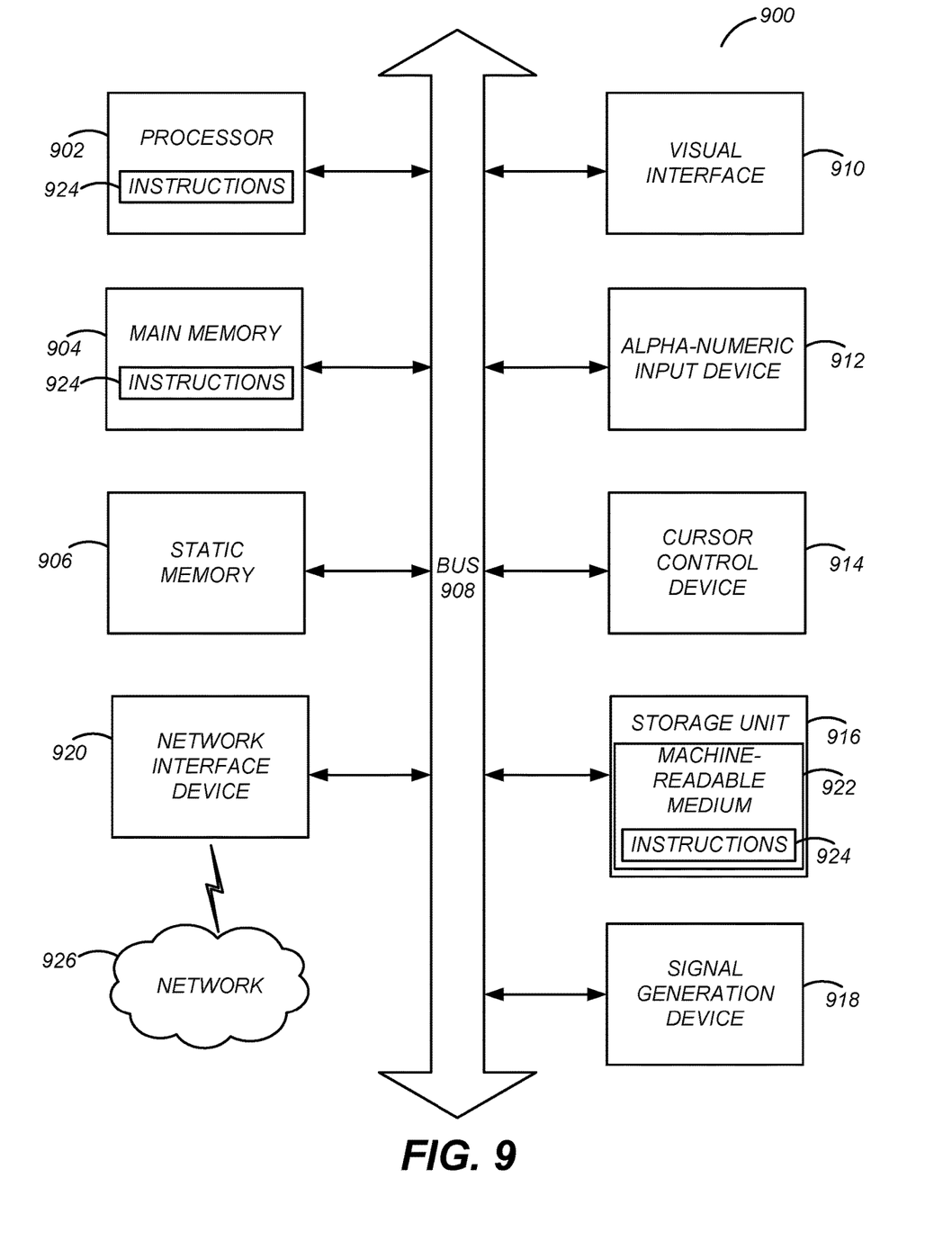
FIG. 9 is a block diagram illustrating components of an example machine able to read instructions from a machine-readable medium and execute them in a processor (or controller), according to one embodiment.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen. The computer system 900 may also include alpha-numeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments of the disclosed configurations has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the disclosure configurations in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments is intended to be illustrative, but not limiting, as to the scope, which is set forth in the following claims.

What is claimed is:

1. A non-transitory computer readable storage medium comprising stored instructions, the instructions when executed by one or more processors cause the one or more processors to:
   detect, during a meeting, a plurality of action items;
   detect, during the meeting, an utterance that corresponds to a completed action item;
   generate, in response to a determination of the utterance, first a similarity score with respect to a first action item of the plurality of action items;
   compare the first similarity score to a first threshold;
   generate, in response a determination that the first similarity score does not exceed the first threshold, a second similarity score with respect to a second action item of the plurality of action items;
   compare the second similarity score to a second threshold, the second threshold exceeding the first threshold; and
   mark, in response to a determination that the second similarity score exceeds the second threshold, the second action item completed.

2. The non-transitory computer readable storage medium of claim 1, wherein the first action item is a most recently uttered action item, wherein the second action item is a next most recently uttered action item with respect to the most recently uttered action item, and wherein the second threshold is weighted based on an amount of time that has passed since the next most recently uttered action item was uttered.

3. The non-transitory computer readable storage medium of claim 1, wherein the instructions to detect, during a meeting, the plurality of action items, further cause the one or more processors to detect each of the plurality of action items within a threshold amount of time from a current time.

4. The non-transitory computer readable storage medium of claim 1, wherein the instructions further cause the one or more processors to:
   receive, from an administrator, a threshold number and threshold amount of time;
   determine a subset of the plurality of action items, wherein the subset includes fewer than the threshold number of action items and each action item of the subset occurred within a threshold amount of time from a time that the utterance was detected; and
   generate similarity scores for action items in the subset based on recency of the action items.

5. The non-transitory computer readable storage medium of claim 1, wherein the instructions to generate the first similarity score further cause the one or more processors to generate the first similarity score based on cosine similarity between vectors that represent the first action item and the completed action item.

6. The non-transitory computer readable storage medium of claim 5, wherein the vectors are created using word embeddings.

7. The non-transitory computer readable storage medium of claim 1, wherein the instructions further cause the one or more processors to:

transmit a notification, via a user interface at a client device, to an owner of the second action item that the action item has been completed.

8. The non-transitory computer readable storage medium of claim 1, wherein the first similarity score is generated using a machine learning model, the machine learning model trained on a plurality of pairings of action items and utterances, wherein each pairing is labeled with a similarity score.

9. The non-transitory computer readable storage medium of claim 1, wherein the first similarity scores is generated using fuzzy logic.

10. The non-transitory computer readable storage medium of claim 1, wherein the instructions further cause the one or more processors to:
rank the first action item higher in a ranking of the plurality of action items, the ranking determined based on a recency of when the action items were detected.

11. A method for closing completed action items during a meeting, the method comprising:
detecting, during a meeting, a plurality of action items;
detecting, during the meeting, an utterance that corresponds to a completed action item;
generating, in response to detection of the utterance, a first similarity score with respect to a first action item of the plurality of action items;
comparing the first similarity score to a first threshold;
generating, in response to a determination that the first similarity score does not exceed the first threshold, a second similarity score with respect to a second action item of the plurality of action items;
comparing the second similarity score to a second threshold, the second threshold exceeding the first threshold; and
marking, in response to a determination that the second similarity score exceeds the second threshold, the second action item completed.

12. The method of claim 11, wherein the first action item is a most recently uttered action item, wherein the second action item is a next most recently uttered action item with respect to the most recently uttered action item, and wherein the second threshold is weighted based on an amount of time that has passed since the next most recently uttered action item was uttered.

13. The method of claim 11, wherein detecting, during a meeting, each of the plurality of action items further comprises detecting each of the plurality of action items within a threshold amount of time from a current time.

14. The method of claim 11, further comprising:
receiving, from an administrator, a threshold number and threshold amount of time;
determining a subset of the plurality of action items, wherein the subset includes fewer than the threshold number of action items and each action item of the subset occurred within a threshold amount of time from a time that the utterance was detected; and
generating similarity scores for action items in the subset based on recency of the action items.

15. The method of claim 11, wherein generating the first similarity score further comprises generating the first similarity score based on cosine similarity between vectors representing the first action item and the completed action item.

16. The method of claim 15, wherein the vectors are created using word embeddings.

17. The method of claim 11, further comprising:
transmitting a notification, via a user interface at a client device, to an owner of the second action item that the action item has been completed.

18. The method of claim 11, wherein the first similarity score is generated using a machine learning model, the machine learning model trained on a plurality of pairings of action items and utterances, wherein each pairing is labeled with a similarity score.

19. The method of claim 11, wherein the first similarity score is generated using fuzzy logic.

20. A system for closing completed action items during a meeting, the system comprising:
a first detection module for detecting, during a meeting, a plurality of action items;
a second detection module for detecting, during the meeting, an utterance that corresponds to a completed action item;
a similarity score generation module for:
generating, in response to a detection of the utterance, a first similarity score with respect to a first action item of the plurality of action items;
comparing the first similarity score to a first threshold;
generating, in response to a determination that the first similarity score does not exceed the first threshold, a second similarity score with respect to a second action item of the plurality of action items; and
comparing the second similarity score to a second threshold, the second threshold exceeding the first threshold; and
an action item completion module for marking, in response to a determination that the second similarity score exceeds the second threshold, the second action item completed.

* * * * *